(12) United States Patent
Kawamura

(10) Patent No.: US 9,953,078 B2
(45) Date of Patent: Apr. 24, 2018

(54) DIALOGUE CONTROL DEVICE, DIALOGUE CONTROL METHOD AND NON-TRANSITORY COMPUTER-READABLE INFORMATION RECORDING MEDIUM

(71) Applicant: CASIO COMPUTER CO., LTD., Tokyo (JP)

(72) Inventor: Yoshihiro Kawamura, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/198,904

(22) Filed: Jun. 30, 2016

(65) Prior Publication Data

US 2017/0060839 A1 Mar. 2, 2017

(30) Foreign Application Priority Data

Sep. 1, 2015 (JP) ................................. 2015-172338

(51) Int. Cl.
| | |
|---|---|
| *G06F 17/27* | (2006.01) |
| *G06F 3/048* | (2013.01) |
| *G06F 17/30* | (2006.01) |
| *G10L 25/63* | (2013.01) |
| *G10L 15/22* | (2006.01) |

(52) U.S. Cl.
CPC .... *G06F 17/30675* (2013.01); *G06F 17/2785* (2013.01); *G06F 17/30976* (2013.01); *G10L 15/22* (2013.01); *G10L 25/63* (2013.01); *G10L 2015/227* (2013.01)

(58) Field of Classification Search
CPC ................................. G06F 17/27; G06F 3/048
USPC ....................... 704/9, 231, 273; 715/727, 765
See application file for complete search history.

(56) References Cited

U.S. PATENT DOCUMENTS

| | | | | |
|---|---|---|---|---|
| 6,731,307 | B1* | 5/2004 | Strubbe | G06N 3/004 704/E17.002 |
| 8,463,595 | B1* | 6/2013 | Rehling | G06F 17/30864 704/9 |
| 9,308,445 | B1* | 4/2016 | Merzenich | A63F 13/80 |
| 2003/0182123 | A1* | 9/2003 | Mitsuyoshi | G06K 9/00335 704/270 |
| 2006/0122834 | A1* | 6/2006 | Bennett | G10L 15/1822 704/256 |
| 2008/0096533 | A1* | 4/2008 | Manfredi | G06N 3/006 455/412.1 |
| 2010/0205541 | A1* | 8/2010 | Rapaport | G06Q 10/10 715/753 |

(Continued)

FOREIGN PATENT DOCUMENTS

| | | |
|---|---|---|
| JP | 2006-178063 A | 7/2006 |
| JP | 2014-219594 A | 11/2014 |

*Primary Examiner* — Seong Ah A Shin
(74) *Attorney, Agent, or Firm* — Fitch Even Tabin & Flannery LLP

(57) ABSTRACT

An emotion estimator of a dialogue control device estimates a dialogue partner's emotion based on the dialogue partner's facial expression or voice prosody. A dialogue controller controls the dialogue with the dialogue partner using a topic selected based on whether the emotion estimated by the emotion estimator is good or bad. Specifically, the dialogue controller controls the dialogue with the dialogue partner based on a topic map created by a topic mapper and including a topic that the dialogue partner likes.

6 Claims, 10 Drawing Sheets

(56) References Cited

U.S. PATENT DOCUMENTS

| | | | | |
|---|---|---|---|---|
| 2011/0161076 A1* | 6/2011 | Davis | ............... | G06F 3/04842 704/231 |
| 2012/0245924 A1* | 9/2012 | Brun | ............... | G06F 17/2745 704/9 |
| 2013/0152000 A1* | 6/2013 | Liu | ............... | G06F 9/44 715/765 |
| 2013/0226587 A1* | 8/2013 | Cheung | ............... | G06K 9/00335 704/273 |
| 2014/0324885 A1* | 10/2014 | McKenzie | ............... | G06F 17/30268 707/748 |
| 2015/0058416 A1* | 2/2015 | Felt | ............... | H04L 67/22 709/204 |
| 2015/0073774 A1* | 3/2015 | Becker | ............... | G06F 17/2785 704/9 |
| 2015/0262238 A1* | 9/2015 | Aitchison | ............... | G06Q 30/0263 705/14.6 |
| 2015/0293682 A1* | 10/2015 | Albouyeh | ............... | G06F 17/3053 715/753 |

* cited by examiner

FIG. 2

| TOPIC MAP | 31 |
|---|---|
| TOPIC | SCORE |
| FOOD | 0 |
| TRAVEL | 0 |
| ANIMAL | 0 |
| MATHEMATICS | 0 |
| SHOPPING | 0 |
| MUSIC | 0 |
| ENTERTAINMENT | 0 |
| INVESTMENT | 0 |
| ⋮ | ⋮ |

FIG. 3

KEYWORD TABLE 35

| TOPIC | KEYWORD | | | | | |
|---|---|---|---|---|---|---|
| | NOUN WORD | | | ADJECTIVE WORD | | |
| FOOD | VEGETABLE | UDON | RAMEN | TASTY | BAD | SPICY |
| TRAVEL | MOUNTAIN | RIVER | SEA | COOL | HOT | FAR |
| ANIMAL | ELEPHANT | LION | DOG | CUTE | BIG | SCARY |
| MATHEMATICS | EQUATION | FUNCTION | DIFFERENTIAL | DIFFICULT | EASY | DON'T KNOW |

FIG. 4

QUESTION SENTENCE TEMPLATE

| TOPIC | QUESTION SENTENCE TEMPLATE |
|---|---|
| FOOD | WHAT KIND OF FOOD DO YOU LIKE? |
| | DO YOU HAVE ANY OTHER FOOD THAT YOU THINK IS (AN ADJECTIVE WORD)? |
| | WHY IS (A NOUN WORD) (AN ADJECTIVE WORD)? |
| | SPEAKING OF (A NOUN WORD), DO YOU LIKE (A SUBORDINATE WORD)? |
| | WHICH FLAVOR OF (A NOUN WORD) DO YOU LIKE? |
| | SPEAKING OF (A NOUN WORD), WHICH (A SUBORDINATE WORD GROUP) DO YOU LIKE? |

FIG. 5

RESPONSE SENTENCE TEMPLATE

| TOPIC | CATEGORY | RESPONSE SENTENCE TEMPLATE |
|---|---|---|
| FOOD | SYMPATHY | (A NOUN WORD) IS TASTY. I LIKE IT TOO. |
| | | (A NOUN WORD) IS (AN ADJECTIVE WORD). YOU ARE RIGHT. |
| | SELF-DISCLOSURE | I LIKE (A NOUN WORD) BETTER THAN (A SIMILAR WORD). |
| | | I DON'T THINK (A NOUN WORD) IS VERY TASTY. |
| | PROVISION OF INFORMATION | THERE IS A GOOD (A NOUN WORD) RESTAURANT IN (A PROPER NOUN OF A LOCATION). |
| | | THE RESTAURANT'S NAME IS XX. |
| | | IT OPENS FROM X A.M. TO X P.M. |

FIG. 6

| TOPIC MAP | 31 |
|---|---|
| TOPIC | SCORE |
| FOOD | 5 |
| TRAVEL | 1 |
| ANIMAL | 3 |
| MATHEMATICS | -1 |
| SHOPPING | 4 |
| MUSIC | 0 |
| ENTERTAINMENT | 0 |
| INVESTMENT | 0 |
| ⋮ | ⋮ |

_DIALOGUE CONTROL DEVICE, DIALOGUE
CONTROL METHOD AND
NON-TRANSITORY COMPUTER-READABLE
INFORMATION RECORDING MEDIUM_

CROSS-REFERENCE TO RELATED
APPLICATION

This application claims the benefit of Japanese Patent Application No. 2015-172338 filed on Sep. 1, 2015, the entire disclosure of which is incorporated by reference herein.

FIELD

The present disclosure relates to a technology for having a dialogue between a human and a machine.

BACKGROUND

Recently, a technology for realizing an interactive dialogue between a human and a machine has become widespread. For having a dialogue between a human and a machine with communication, artificial intelligence (AI) and voice recognition technologies are required, but with a context analysis and a response alone, communication cannot be established. A technology for estimating a human's emotion and the like is required.

For example, Patent Literature 1, Unexamined Japanese Patent Application Kokai Publication No. 2006-178063 discloses a technology for estimating emotion of a user who is a dialogue partner and utilizing the estimated emotion for a dialogue. In Patent Literature 1, utterance contents are converted to text every time a user makes an utterance and the user's emotion is estimated by whether a word showing good or bad emotion is included in the text. A device replies depending on the estimated emotion (for example, if the estimated emotion is negative, the device utters "Are you OK?" or the like).

Patent Literature 2, Unexamined Japanese Patent Application Kokai Publication No. 2014-219594 discloses a technology of recognizing emotion of a user from user's voice and selecting a conversation algorithm that corresponds to the emotion of the user.

SUMMARY

A dialogue control device related to the present disclosure includes a selector which selects a topic with reference to a dialogue database; an emotion estimator which estimates a dialogue partner's emotion; and a dialogue controller which controls a dialogue with the dialogue partner using the topic selected by the selector, and changes the topic that is to be selected from the dialogue database based on the dialogue partner's emotion estimated by the emotion estimator to control the dialogue with the dialogue partner.

BRIEF DESCRIPTION OF THE DRAWINGS

A more complete understanding of this application can be obtained when the following detailed description is considered in conjunction with the following drawings, in which:

FIG. 2 is a diagram showing an example of a topic map before a score processing;

FIG. 3 is a diagram showing an example of a keyword table;

FIG. 4 is a diagram showing examples of question sentence templates;

FIG. 5 is a diagram showing examples of response sentence templates;

FIG. 6 is a diagram showing an example of a topic map after a score processing;

DETAILED DESCRIPTION

Figure 1:
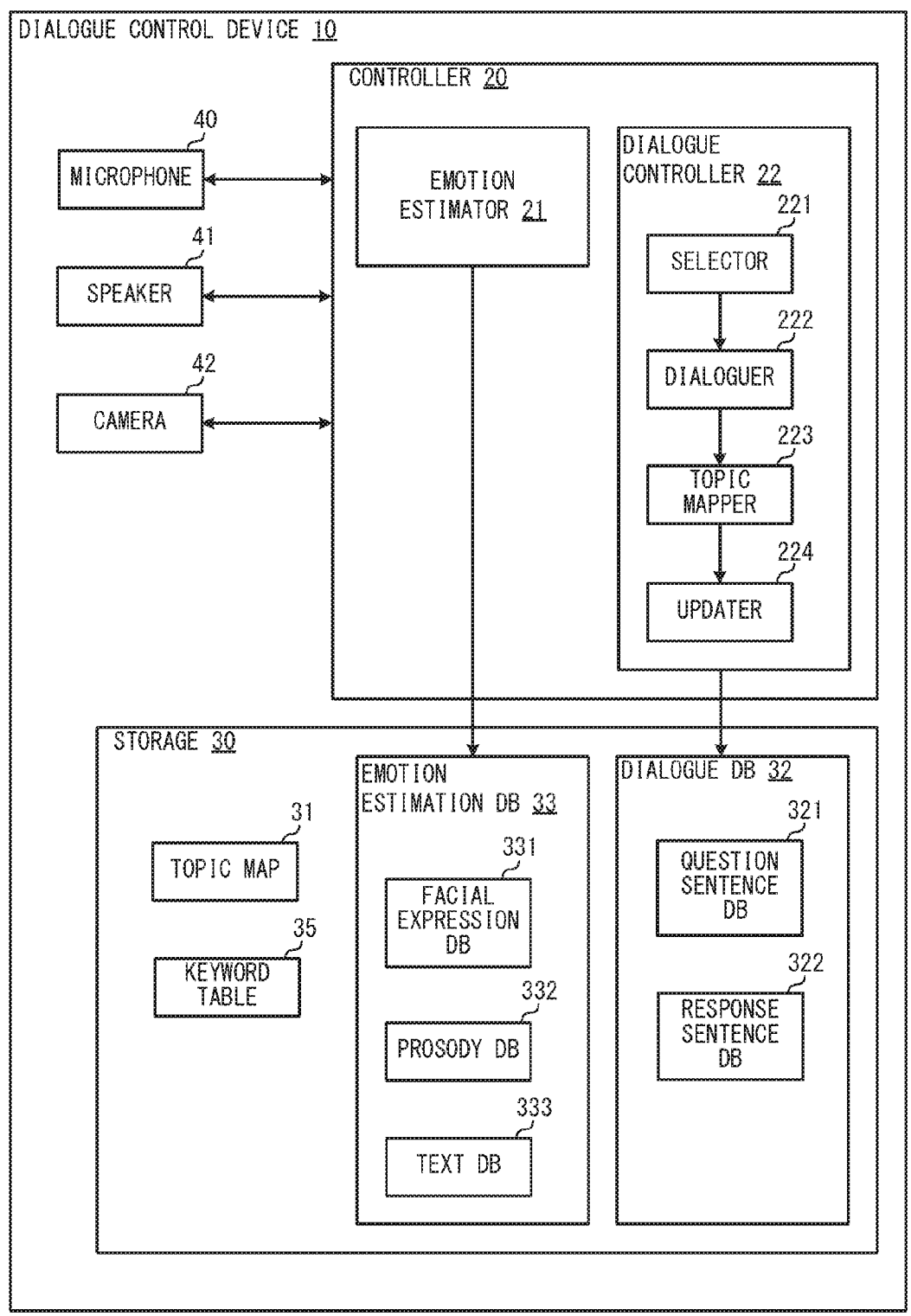
FIG. 1 is a block diagram showing a configuration of a dialogue control device related to an embodiment.

With reference to FIG. 1, a summary of a dialogue control device related to an embodiment of the present disclosure is described below. The dialogue control device 10 includes a microphone 40 for picking up a dialogue partner's voice, a speaker 41 for outputting voice to the dialogue partner and a camera 42 for taking an image of the dialogue partner as physical interfaces with the dialogue partner.

The dialogue control device 10 estimates emotion based on the voice from the microphone 40 and the image from the camera 42, and has a dialogue about a topic depending on the estimated emotion through the speaker 41.

It is noted that the dialogue control device 10, which is a dialogue engine may be applied to a robot. The dialogue control device 10 is artificial intelligence that is applicable to almost all the scenes requiring interaction with a human and the range of application is wide, such as car navigation systems, interactive applications for smartphones and two-dimensional digital characters. In the explanation below, the terms, "dialogue", "conversation" and "communication" are all used in the same meaning of interactively exchanging information in a natural language.

The dialogue control device 10 includes a controller 20 and a storage 30 in addition to the physical interfaces (the microphone 40, the speaker 41 and the camera 42) with the dialogue partner.

The controller 20 includes a central processing unit (CPU), a read only memory (ROM), a random access memory (RAM) and the like. The controller 20 realizes a function of each unit (an emotion estimator 21 and a dialogue controller 22) by executing a program stored in ROM (for example, a program related to topic mapping and dialogue control processes described below).

The storage 30 is a non-volatile memory, such as a hard disk or a flash memory, and stores various databases (a dialogue DB 32 and an emotion estimation DB 33). These DBs are described below.

Next, functions of the controller 20 are explained.

The controller 20 includes the emotion estimator 21 and the dialogue controller 22 as functions.

The emotion estimator 21 estimates the dialogue partner's emotion. The emotion estimator 21 estimates the dialogue partner's emotion based on the emotion estimation DB 33 (a facial expression DB 331, a prosody DB 332 and a text DB 333), the dialogue partner's face image taken by the camera 42 and the dialogue partner's voice picked up by the microphone 40.

The facial expression DB 331 is a database for storing template images per facial expression obtained from machine learning with many samples in advance. The emotion estimator 21 estimates the dialogue partner's emotion by matching the dialogue partner's face image taken by the camera 42 and the template images. In this embodiment, six basic emotions, which are pleasure, fear, hate, anger, sorrow and surprise, are estimated as emotion.

The prosody DB 332 is a database for storing prosodies (characteristics of ways of speaking, such as the pitch of a voice, the volume of sound, intonation, rhythm and pauses) associated with each emotion. The emotion estimator 21 extracts a prosody from the dialogue partner's voice picked up by the microphone 40 to estimate the dialogue partner's emotion from the extracted prosody and the prosody DB 332.

The text DB 333 is a database for storing words showing emotion (nouns, adjectives and the like) associated with each emotion. For example, the nouns "pass" and "victory" are associated with the emotion "pleasure" and the adjectives "sorry" and "boring" are associated with the emotion "sorrow". The emotion estimator 21 converts voice picked up by the microphone 40 to text and resolves the text into words by morphological analysis to estimate the emotion with reference to the text DB 333.

The emotion estimator 21 estimates the dialogue partner's emotion using any one of these DBs (the facial expression DB 331, the prosody DB 332 and the text DB 333) or a combination thereof. The estimation of the emotion based on the facial expression is conducted every time shortly after an utterance made by a dialoguer 222 to be described below. This is because the emotion of the dialogue partner, who is being a listener, tends to be more apparent on the facial expression of the dialogue partner shortly after the utterance by the dialoguer 222 than some time after the utterance. The estimation of the emotion based on prosody and text is conducted every time the dialogue partner makes an utterance.

Next, functions of the dialogue controller 22 are explained.

The dialogue controller 22 controls the dialogue with the dialogue partner with a topic selected based on whether the emotion estimated by the estimator 21 is good or bad. The dialogue controller 22 includes a selector 221, the dialoguer 222, a topic mapper 223 and an updater 224. It is noted that the selector 221 corresponds to the first and second selector and the dialoguer 222 corresponds to the first and second dialoguer respectively. In the following description, firstly (i) a stage of creating a topic map by searching and learning the dialogue partner's likes and tastes (a mapping stage) and then (ii) a stage of utilizing the created topic map to control the dialogue with the dialogue partner (a utilizing stage) are explained.

The selector 221 randomly selects one of a plurality of different topics. Specifically, the selector 221 randomly selects one of the topics from a topic map 31 before a score processing shown in FIG. 2. The topic map 31 is a one-dimensional table where a plurality of different topics (in the example of the figure, food, travel, animal and the like) are associated with scores showing the level of the dialogue partner's interests in each topic. It is noted that all the scores are zero by default.

Next, the dialoguer 222 has a dialogue with the dialogue partner based on the topic selected by the selector 221. This dialogue may be conducted by any approach, but in this embodiment, the dialogue with the dialogue partner is conducted by using each dialogue DB included in the dialogue DB 32 (a question sentence DB 321 and a response sentence DB 322). The dialogue in this case is not a task-oriented dialogue for achieving one task (for example, accepting reservations, showing directions or the like) but a non task-oriented dialogue intended to continue a talk, such as a chat.

This non task-oriented dialogue has yet to be developed fully, but in this embodiment, tens of thousands of patterns for question or response candidates are previously prepared in the DB on a topic basis to deal with various topics. These questions and responses are made utilizing a keyword table 35 shown in FIG. 3. The keyword table 35 is created based on word dictionaries and the like, and associates noun and adjective words per topic. A noun word means a noun associated with a topic and an adjective word means an adjective associated with a topic.

The keywords shown in FIG. 3 is only part of the keywords, and in practice, tens of thousands of keywords required for dialogues are prepared per topic. Also, each keyword is associated with other keywords according to hierarchical relations (take vegetables for example, vegetable, which expresses a superordinate concept, includes cabbage and onion, which express subordinate concepts) and similarity relations (for example, udon and ramen are similar in that both of them are noodles). In addition, when the dialogue partner utters an unknown word, the dialogue controller 22 may add the word as a new keyword (for example, the dialogue partner's name or the like) to learn the word.

The question sentence DB 321 is a database for storing a plurality of different question sentence templates on a topic basis. The dialoguer 222 selects a question sentence template from the question sentence DB 321 depending on situations, such as asking a question at the opening of a conversation, asking a question about a response from the dialogue partner, or responding to a continued silence from the dialogue partner on a certain topic, and actuates the speaker 41 to utter a question.

In FIG. 4, an example of question sentence template variations for the topic "food" is shown. This question sentence template has a format in which a keyword (a noun or adjective word) is substituted, and a subordinate word is a keyword that falls under a superordinate concept keyword. The dialoguer 222 uses a keyword about "food" from the keyword table 35 randomly or a keyword relating to "food" included in the dialogue partner's utterance to create and utter a question sentence template.

Next, the response sentence DB 322 is a database for storing a plurality of different response sentence templates on a topic basis. The response sentence templates can be written in a markup language, for example, Extensible Markup Language (XML) or the like. Specifically, the response sentence templates are written in Artificial Intelligence Markup Language (AIML), and when a keyword (a noun or adjective word) is included in the dialogue partner's utterance, the dialoguer 222 responds with a response template using the keyword.

In FIG. 5, an example of response sentence template variations for the topic "food" is shown. The response sentence template has a format in which a keyword (a noun or adjective word) is substituted for making a response when the dialogue partner's utterance has a keyword included in the keyword table 35. It is noted that a similar word means a keyword in a similarity relation in the keyword table 35

(such as udon and ramen). The category types (sympathy, self-disclosure and provision of information) are examples and more category types may be added.

For example, if there is a keyword "ramen" in the dialogue partner's utterance about the topic "food", the dialoguer 222 responds, for example, "Ramen is tasty. I like it, too." as a sympathy response sentence template; "I like udon better than ramen." as a self-disclosure response sentence template; or "Which flavor of ramen do you like?" as a question sentence template. Templates may be selected randomly, or according to a context in the dialogue history or in order of priority.

The provision of information in this case means a template for providing information related to search results on the Internet. This information related to the provision of information (a proper noun of a location or the like) is obtained by the dialoguer 222, upon being triggered by a search request from the dialogue partner or actively at an appropriate timing during the dialogue. Then, the dialoguer 222 applies the obtained information to the response template for the provision of information to speak.

It is noted that one response sentence template is associated with a plurality of keywords to improve versatility, but other approaches may be used. A specific response sentence may be associated with a particular keyword. For example, a noun word "lion" on a topic "animal" may be associated with a plurality of lion-specific response sentence templates, such as "Only male lions have manes, don't they?" and "The lion is the king of beasts, isn't it?", and one of the templates may be randomly selected for utterance.

As described above, the dialoguer 222 uses tens of thousands of question and response sentence template patterns per topic, which are included in the question sentence DB 321 and the response sentence DB 322, to make at least several conversation rounds, not an exchange of questions and answers, on each topic. A specific example 1, where the dialoguer 222 has a dialogue with the dialogue partner using each of these DBs, is explained below in the case where the selector 221 selects the topic "food". It is noted that dialogue lines are numbered in chronological order, such as (1) and (2).

(1) Dialogue control device 10: "Shall we talk about food?"
(2) Dialogue control device 10: "What kind of food do you like?"
(3) Dialogue partner: "I like udon."
(4) Dialogue control device 10: "Udon is tasty. I like it, too."
(5) Dialogue control device 10: "Do you have any other food that you think is tasty?"
(6) Dialogue partner: "I also like deep-fried pork cutlets."
(7) Dialogue control device 10: "Deep-fried pork cutlets are tasty. You are right."
(8) Dialogue control device 10: "There is a good deep-fried pork cutlet restaurant in Ueno."
(9) Dialogue partner: "Really? What is the restaurant's name?"
(10) Dialogue control device 10: "The restaurant's name is XX."
(11) Dialogue partner: "What are the hours of operation?"
(12) Dialogue control device 10: "It opens from 10 a.m. to 9 p.m."
(13) Dialogue partner: "Got it. I will go there next time. Thank you."
(14) Dialogue control device 10: "You are welcome."

In this specific example 1, the dialoguer 222 starts with an opening line to talk about the topic "food" selected by the selector 221 in (1), selects an opening question sentence template for "food" from the question sentence DB 321 to ask a question in (2), responds with a sympathy response sentence template for "food" from the response sentence DB 322 in (4) and (7), searches a noun word ("deep-fried pork cutlets" in the specific example 1) of "food" that the dialogue partner utters to provide information in (8), provides information on the questions from the dialogue partner in (10) and (12) and lastly responds with a response sentence template "You are welcome." associated with the keyword "thank you" from the response sentence DB 322 in (14). It is noted that the keyword table 35 and the response sentence DB 322 prepare keywords and response sentence templates unrelated to specific topics but based on a daily life scenario, such as greetings, other than the keywords and response sentence templates related to specific topics.

Although non task-oriented conversation scenarios are of all descriptions as this specific example 1, the dialoguer 222 appropriately combines the dialogue DB 32 (the question sentence DB 321 and the response sentence DB 322) to have a dialogue about the topic as shown in (1) to (14) above. It is noted that for figuring out a part of speech (a noun, an adjective or the like), whether a sentence is a question, or the like, the dialogue partner's utterance picked up by the microphone 40 may be converted to text to perform a morphological analysis on.

Also, for a timing for the dialoguer 222 to autonomously search information, rules (search timing rules) may be set in advance, such as conducting a search when a predetermined number or more of nouns (in the specific example 1 above, the second noun "deep-fried pork cutlets") are obtained from the dialogue partner. In addition, if the dialogue partner's utterance obtained by the voice recognition is fuzzy, an error handling, such as a confirmatory response, may be appropriately performed (for example, asking for clarification "Do you mean (a noun word)?" or the like).

The emotion estimator 21 in this case estimates the dialogue partner's emotion using the facial expression DB 331 every time the dialogue control device 10 makes an utterance (for example, shortly after asking the dialogue partner, "What kind of foods do you like?") in the specific example 1 of the dialogue above. Further, the emotion estimator 21 estimates the dialogue partner's emotion using the prosody DB 332 and the text DB 333 every time the dialogue partner makes an utterance (for example, when the dialogue partner says, "Got it. I will go there next time. Thank you."). These enable the dialogue partner's emotion to be estimated at the time of the utterance by the dialogue control device 10 and at the time of the utterance by the dialogue partner.

Returning to FIG. 1, the topic mapper 223 creates a topic map for leading a conversation without hurting the dialogue partner's emotion. Specifically, the topic mapper 223 adds to or subtracts from a score of the topic currently selected by the selector 221 depending on whether the emotion estimated by the emotion estimator 21 is good or bad while the dialoguer 222 is having a dialogue with the dialogue partner.

It is noted that the topic mapper 223 creates a topic map for each dialogue partner, but for ease of understanding, examples of a case in which there is only one dialogue partner are explained. Furthermore, unless the explanation needs to particularly specify a topic map 31 that shows the single dialogue partner's likes and tastes, a topic map is simply called a topic map in general terms in the explanation below. In addition, as an example, good emotion is explained as "pleasure" that includes positive feelings, such as fun or happiness, and bad emotion is explained as "fear, hate, anger or sorrow" that include negative feelings, such as boredom and disappointment.

The topic mapper 223 adds to a score of the currently selected topic if the emotion estimated by the emotion estimator 21 is good, and subtracts from a score of the currently selected topic if the emotion estimated by the emotion estimator 21 is bad. For example, in the specific example 1 described above, if the dialogue partner's emotion is "pleasure" shortly after the dialogue control device 10 makes an utterance, "There is a good deep-fried pork cutlet restaurant in Ueno.", the topic mapper 223 adds one (+1) to the score of the food on the topic map 31.

On the other hand, unlike the specific example 1, if the dialogue partner replies, "Why do you ask that?", to the question, "What kind of foods do you like?", and the emotion "hate" is estimated from the prosody, the topic mapper 223 subtracts one (−1) from the score of the food being selected on the topic map 31. In this manner, the topic mapper 223 adds to or subtracts from a score every time the dialogue partner's emotion is estimated during the dialogue on the currently selected topic. Such score processing is performed for each topic to create a topic map 31 as shown in FIG. 6.

Returning to FIG. 1, the updater 224 updates each score on the topic map 31 created by the topic mapper 223 depending on whether the dialogue partner's emotion during the dialogue is good or bad. This updater 224 is described below.

Figure 7:
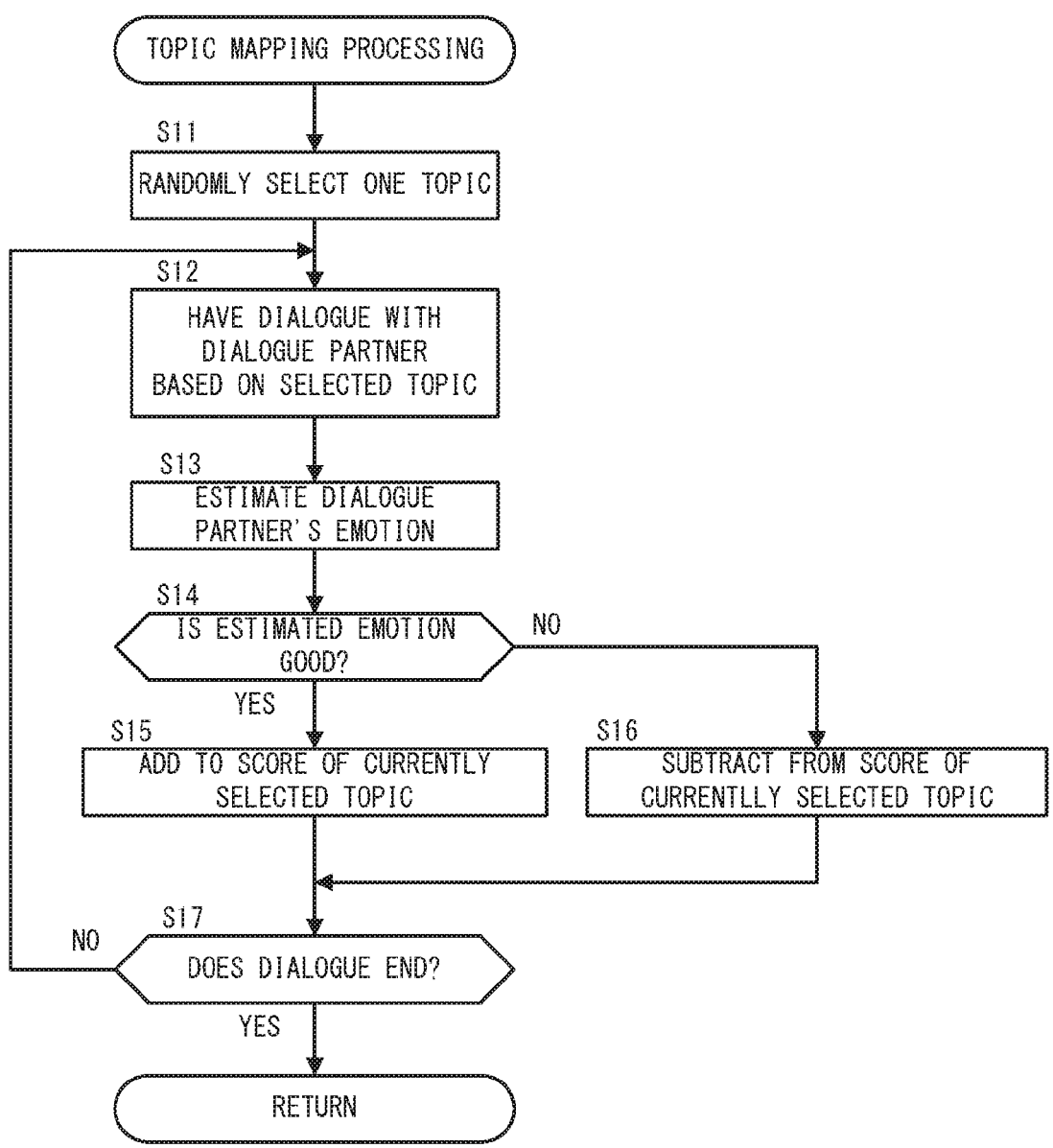
FIG. 7 is a diagram showing an example of a flowchart of a topic mapping processing.

The above explains the functions of each unit of the dialogue controller 22. The following describes the topic mapping processing with reference to FIG. 7. The topic mapping processing is performed when the dialogue control device 10 has a dialogue with the dialogue partner using the default topic map 31 (for example, when triggered by turning on the dialogue function of the dialogue control device 10 by the dialogue partner). It is difficult for the dialogue control device 10 to have a conversation with the dialogue partner's emotion kept good without the machine learning on the dialogue partner's likes and tastes. This is why the topic map is created prior to the topic map utilizing stage.

Firstly, the selector 221 randomly selects one topic (Step S11). Next, the dialoguer 222 has a dialogue with the dialogue partner based on the selected topic (Step S12).

Specifically, in the manner described above, the dialoguer 222 has a dialogue, such as (1) to (14) of the above specific example 1, using the dialogue DB 32 (the question sentence DB 321 and the response sentence DB 322).

During these steps, the emotion estimator 21 estimates the dialogue partner's emotion (Step S13). Specifically, in the manner described above, the emotion estimator 21 estimates the dialogue partner's emotion using the emotion estimation DB 33 (the facial expression DB 331, the prosody DB 332 and the text DB 333) shortly after the dialogue control device 10 or the dialogue partner makes an utterance.

Next, the topic mapper 223 determines whether the estimated emotion is good or not (Step S14). The topic mapper 223 adds to a score of the currently selected topic (Step S15) if the estimated emotion is good (Yes in Step S14) while the topic mapper 223 subtracts from a score of the currently selected topic (Step S16) if the estimated emotion is not good (No in Step S14).

After Step S15 or S16, the topic mapper 223 determines whether the dialogue ends or not (Step S17), and if the dialogue has not ended (No in Step S17), the processing returns to Step S12. It means that the processes of Steps S12 to S16 repeat until the dialogue ends and the scores are processed every time the emotion is estimated during the dialogue. It is noted that whether the dialogue ends or not may be determined based on a condition, for example, if there are the predetermined number or more of rounds in the dialogue and a silent period of the dialogue partner after the rounds has continued for a predetermined period, the dialogue ends. The dialogue may be forced to end if the dialogue partner makes an utterance with a clear intention to stop the conversation, such as "I don't want to talk about that topic." or "I'm not interested.", even before the dialogue reaches the predetermined number of rounds, or if a score reaches the predetermined number (for example, −5) as a result of subtraction. The timing of ending a dialogue is a matter that can be designed as appropriate.

If the dialogue ends at this point (Yes in Step S17), the processing returns to Step S11 and the dialogue is switched from the currently selected topic to another topic to repeat Steps S12 to S17. For example, in the above specific example 1, the score of "food" is five as shown on the topic map 31 of FIG. 6 when the dialogue of (1) to (14) ends. Then the topic mapper 223 switches to another topic other than "food" to continue the dialogue. In this manner, the topic map 31 shown in FIG. 6 is created by the topic mapper 223 that switches the topics and repeats the dialogue steps.

It is noted that the dialogue does not necessarily end as shown in the specific example 1. For example, a dialogue may naturally switch to another topic or the dialogue partner may suddenly suggest talking about a certain topic. For preparing for such an interrupting processing, switching to another topic may be triggered by a word related to another topic uttered by the dialogue partner during the dialogue about a topic currently selected.

For example, in the above specific example 1, when the dialogue control device 10 utters, "There is a good deep-fried pork cutlet restaurant in Ueno." and then the dialogue partner replies, "Really? By the way, I haven't gone shopping in Ameyoko in Ueno recently", the dialoguer 222 switches the topics from "food" to "shopping" using "shopping" as a keyword to continue the dialogue. In this case, the score of the food being selected remains the same as the score before switching to another topic.

The above explains the topic mapping processing. In this explanation, not all topic scores are processed on the topic map 31 in FIG. 6. This is because grasping the likes and tastes is good enough to have a dialogue with the dialogue partner utilizing the topic map and the timing of transitioning from the learning stage of creating the topic map to the dialogue control processing with the topic map utilization can be conveniently set. For example, the processing may transition to the stage of utilizing the topic map when three topics have scores of three or more after repeating the topic mapping processing several times or when all the topic scores are processed.

The following explains variations of the dialogue control processing 1 to 3 that lead a conversation based on the dialogue partner's likes and tastes utilizing the created topic map (the topic map 31 of FIG. 6) in order. It is noted that on the utilizing stage the selector 221 (the second selector), the dialoguer 222 (the second dialoguer) and the updater 224 work, but not the topic mapper 223. The functions of the dialoguer 222 are the same as the functions of the dialoguer 222 on the topic mapping stage.

(Dialogue Control Processing 1)

Figure 8:
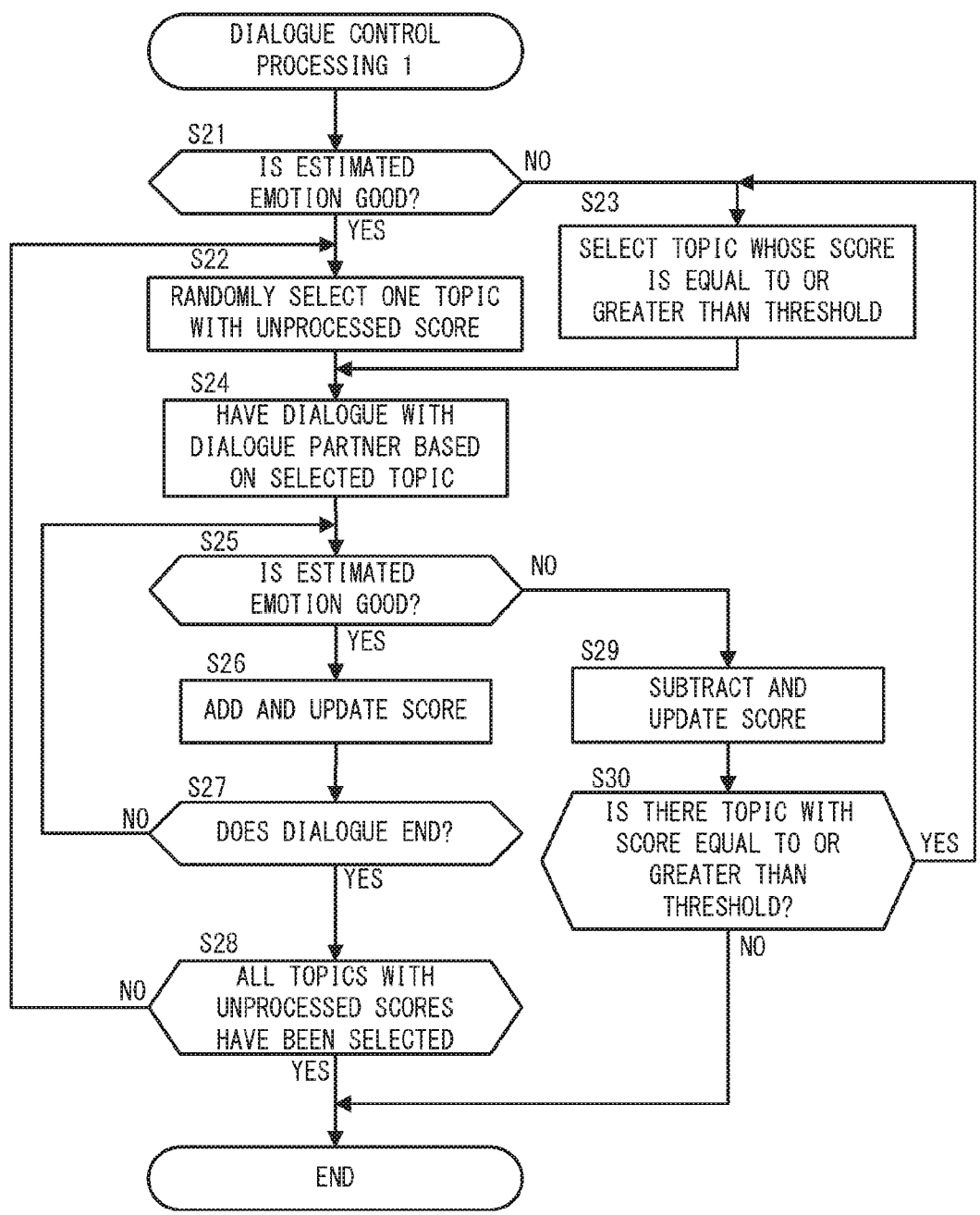
FIG. 8 is a diagram showing an example of a flowchart of the dialogue control processing 1.

With reference to FIG. 8, the dialogue control processing 1 is now explained. This dialogue control processing 1 is triggered by taking an image of the dialogue partner with the camera 42 by the dialogue control device 10 after the transition from the topic mapping stage to the utilizing stage.

Firstly, the emotion estimator 21 determines whether the estimated emotion of the dialogue partner whose image is taken by the camera 42 is good or not (Step S21). If the estimated emotion is good (Yes in Step S21), the selector 221 randomly selects one topic with an unprocessed score (Step S22). For example, the selector 221 selects music from the topics with a score of 0 (music, entertainment and investment) on the topic map 31.

On the other hand, if the estimated emotion is not good (No in Step S21), the selector 221 selects a topic with a score equal to or greater than a threshold (Step S23). If the threshold is three for the scores, the selector 221 randomly selects animal from the topics with a score of three or more (food, animal and shopping) on the topic map 31. This threshold may be used as a guideline value for a topic that the dialogue partner seems to like.

After Step S22 or S23, the dialoguer 222 has a dialogue with the dialogue partner based on the selected topic (Step S24). In this manner, in Steps S21 to S24, the topics are selected and switched depending on the dialogue partner's emotion estimated before a dialogue and the dialogue starts.

When the dialogue starts with the selected topic, the emotion estimator 21 estimates the dialogue partner's emotion and determines whether the estimated emotion is good or not (Step S25). If the estimated emotion is good (Yes in Step S25), the updater 224 adds to and updates a score (Step S26) as well as the dialoguer 222 determines whether the dialogue ends or not (Step S27). If the dialogue has not ended, the processing returns to Step S25 and the dialogue continues with the selected topic while the dialogue partner's emotion during the dialogue is good (a loop of Steps S25 to S27). When the dialogue ends with the estimated emotion kept good (Yes in Step S27), the selector 221 determines whether all topics with unprocessed scores have been selected (Step S28). If all the topics with the unprocessed scores have not been selected (No in Step S28), the processing returns to Step S22. On the other hand, if all the topics with the unprocessed scores have been selected (Yes in Step S28), the processing ends.

On the other hand, if the dialogue partner's estimated emotion becomes not good during the dialogue on the selected topic (No in Step S25), the updater 224 subtracts from and updates a score (Step S29) as well as the selector 221 determines whether there is a topic with a score equal to or greater than the threshold (Step S30). If there is a topic with a score equal to or greater than the threshold (Yes in Step S30), the processing returns to Step S23. On the other hand, if there is no topic with a score equal to or greater than the threshold (No in Step S30), the processing ends.

According to this dialogue control processing 1, the currently selected topic (the topic with an unprocessed score) is used for the dialogue and the topic map is updated while the emotion is good, and on the other hand, the dialogue is switched to a topic with a score equal to or greater than the threshold to continue the dialogue when the emotion becomes bad. The specific example 2 of having a dialogue with the dialogue partner according to this dialogue control processing 1 is described below. In this specific example 2, it is assumed that the dialogue partner's emotion is determined as being good when the dialogue control device 10 first catches the dialogue partner with the camera 42 in Step S21.

(1) Dialogue control device 10: "Shall we talk about music?"

(2) Dialogue control device 10: "What kind of music do you like?"

(3) Dialogue partner: "I like foreign music."

(4) Dialogue control device 10: "I like Japanese music better than foreign music."

(5) Dialogue partner: "Hmm. I don't like Japanese music much."

(6) Dialogue control device 10: "I see. I'm sorry."

(7) Dialogue control device 10: "Shall we talk about animals then?"

(8) Dialogue partner: "Animals, good! Let's talk."

(9) Dialogue control device 10: "What kind of animals do you like?"

After this line (9), the dialogue continues. The selector 221 selects the topic "music" with an unprocessed score in (1) of this specific example 2, the dialoguer 222 asks a question using the opening question sentence template of "music" from the question sentence DB 321 in (2), the dialoguer 222 responds with the response sentence template using the noun word "foreign music" included during the dialogue partner's utterance and the similar word "Japanese music" in (4), the emotion estimator 21 estimates that the dialogue partner's emotion is bad in (5) and the dialoguer 222 switches to the topic "animal" with a score equal to or greater than three to make a fresh start of the dialogue in (7).

According to this dialogue control processing 1, although the machine learning on topics with unprocessed scores continues while the dialogue partner's emotion is good, the dialogue is switched to another topic with a score equal to or greater than the threshold to continue the dialogue when the dialogue partner's emotion becomes bad. This is how the dialogue can continue with the learned topics that the dialogue partner likes while topics that the dialogue partner likes are searched. Therefore, the dialogue partner's likes and tastes are found out and, at the same time, the dialogue partner can enjoy the communication without being bored.

(Dialogue Control Processing 2)

Figure 9:
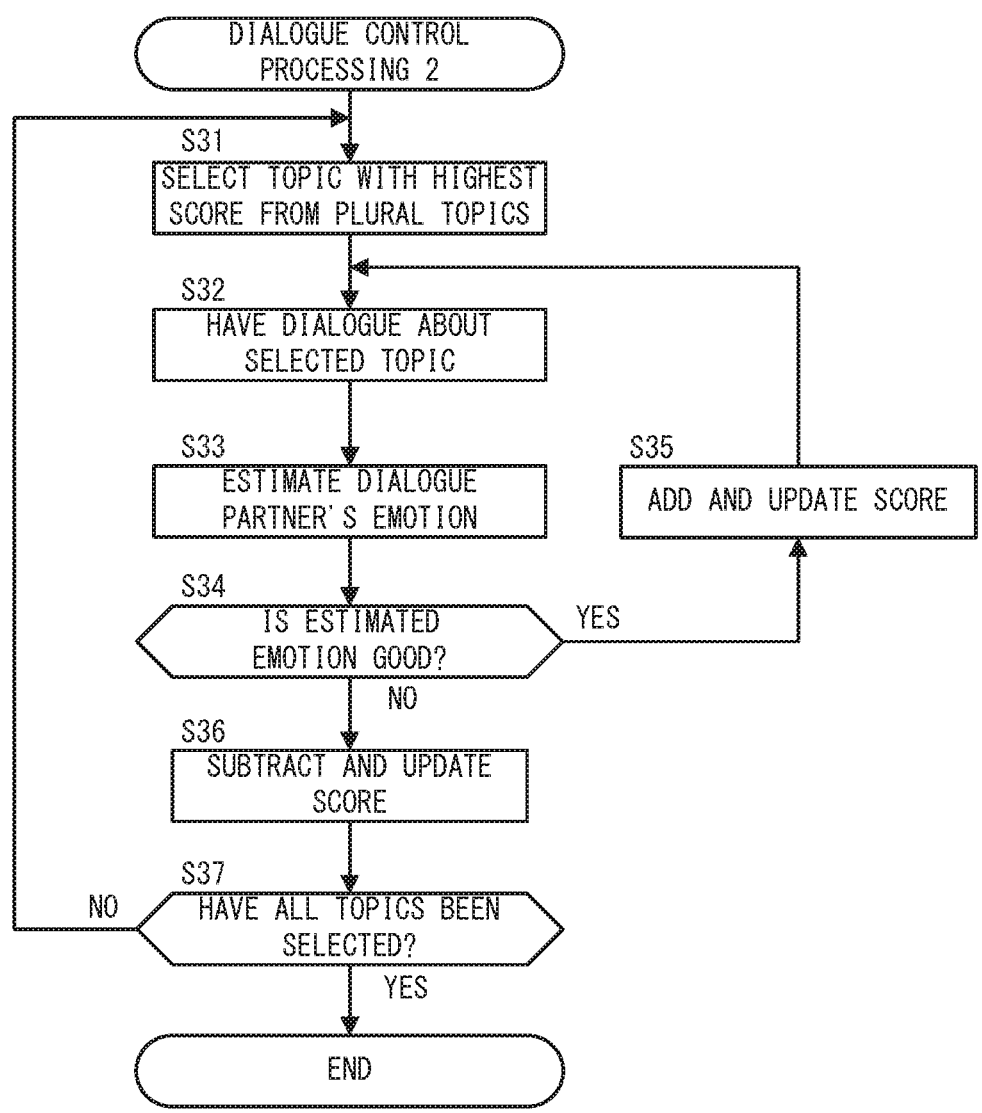
FIG. 9 is a diagram showing an example of a flowchart of the dialogue control processing 2.

With reference to FIG. 9, the dialogue control processing 2 is now explained. The start timing of this dialogue control processing 2 is the same as the start timing of the dialogue control processing 1.

Firstly, the selector 221 selects a topic with the highest score from a plurality of topics (Step S31). With the topic map 31 of FIG. 6, the selector 221 selects "food", which has the highest score, from the topics.

Next, the dialoguer 222 has a dialogue on the selected topic (Step S32). In the manner described above, the dialoguer 222 performs a dialogue using the dialogue DB 32 (the question sentence DB 321 and the response sentence DB 322).

Next, the emotion estimator 21 estimates the dialogue partner's emotion (Step S33). The emotion estimator 21 estimates the dialogue partner's emotion in the manner described above using the emotion estimation DB 33 (the facial expression DB 331, the prosody DB 332 and the text DB 333) shortly after the dialogue control device 10 or the dialogue partner makes an utterance.

Next, the emotion estimator 21 determines whether the estimated emotion is good or not (Step S34). If the estimated emotion is good (Yes in Step S34), the updater 224 updates and adds to a score of the currently selected topic (Step S35). Then the processing returns to Step S32 to continue the dialogue with the dialogue partner.

On the other hand, if the estimated emotion is not good (No in Step S34), the updater 224 subtracts from and updates a score of the currently selected topic (Step S36). Then the dialogue controller 22 determines whether all topics have been selected (Step S37) and if all the topics are not selected (No in Step S37), the processing returns to Step S31. In this Step S31, the topic "shopping" is selected since the topic "shopping" has a score of four, the second highest after the score of five for the currently selected topic "food".

In this manner, while the scores on the topic map 31 are updated, the dialogue still continues with the currently selected topic if the estimated emotion is good and the dialogue is switched to another topic with the next highest score to have a dialogue if the estimated emotion is not good. It is noted that if the scores after the highest and the second highest scores are all zero, the selector 221 may randomly select one topic from a plurality of topics with unprocessed scores in Step S31.

At this point, if all the topics are selected (Yes in Step S37), the dialogue control processing 2 ends.

The specific example 3 where the dialogue control processing 2 is applied to have a dialogue with the dialogue partner is now described below.

(1) Dialogue control device 10: "Shall we talk about food?"

(2) Dialogue control device 10: "What kind of meat do you like, pork, beef or chicken?"

(3) Dialogue partner: "I mainly have vegetables recently because I'm on a diet."

(4) Dialogue control device 10: "Shall we talk about shopping then?"

(5) Dialogue control device 10: "Have you recently done any shopping?"

(6) Dialogue partner: "Well, I don't feel like going shopping, so I haven't bought anything."

(7) Dialogue control device 10: "Shall we talk about animals then?"

(8) Dialogue control device 10: "(the dialogue partner's name), what kind of animal do you want to see?"

(9) Dialogue partner: "Well, I want to see a lion."

(10) Dialogue control device 10: "The lion is the king of beasts, isn't it?"

After this line (10), the dialogue continues. Generally, dialogue partners have some topics that the dialogue partners do not want to be asked about or to talk about even though the dialogue partners are highly interested in the topics (in the above specific example 3, the topics "food" and "shopping" with high scores) and the dialogue partners' emotions change depending on the feelings. The specific example 3 is an example of a case where the dialogue partner's emotion to the topics "food" with the highest score and "shopping" with the second highest score is bad.

In this dialogue control processing 2, the dialogue control device 10 switches to the topic with a next highest score if the dialogue partner's emotion is bad. It means that, in the specific example 3, the dialogue is switched from "food" to "shopping" after the dialogue partner's reply (3), "I mainly have vegetables recently because I'm on a diet.", and from "shopping" to "animal" after the dialogue partner's reply (6), "Well, I don't feel like going shopping, so I haven't bought anything."

It is noted that the dialoguer 222 adds the dialogue partner's name that the dialoguer 222 learned to the opening question sentence template of the topic "animal" in (8). This makes the dialogue partner relate to the dialogue control device 10 to more easily establish a close relationship. Also, one more line, such as "I see. I'm sorry.", may be inserted before the topic switch if the dialogue partner's estimated emotion is not good.

As described above, according to the dialogue control processing 2, the dialogue control device 10 selects a topic with the highest score from the topics other than the currently selected topics based on the topic map to continue the conversation every time the dialogue partner's emotion becomes bad. This enables the dialogue control device 10 to continue the communication without making the dialogue partner bored and to lead the conversation without hurting the dialogue partner's emotion based on the dialogue partner's likes and tastes.

(Dialogue Control Processing 3)

Figure 10:
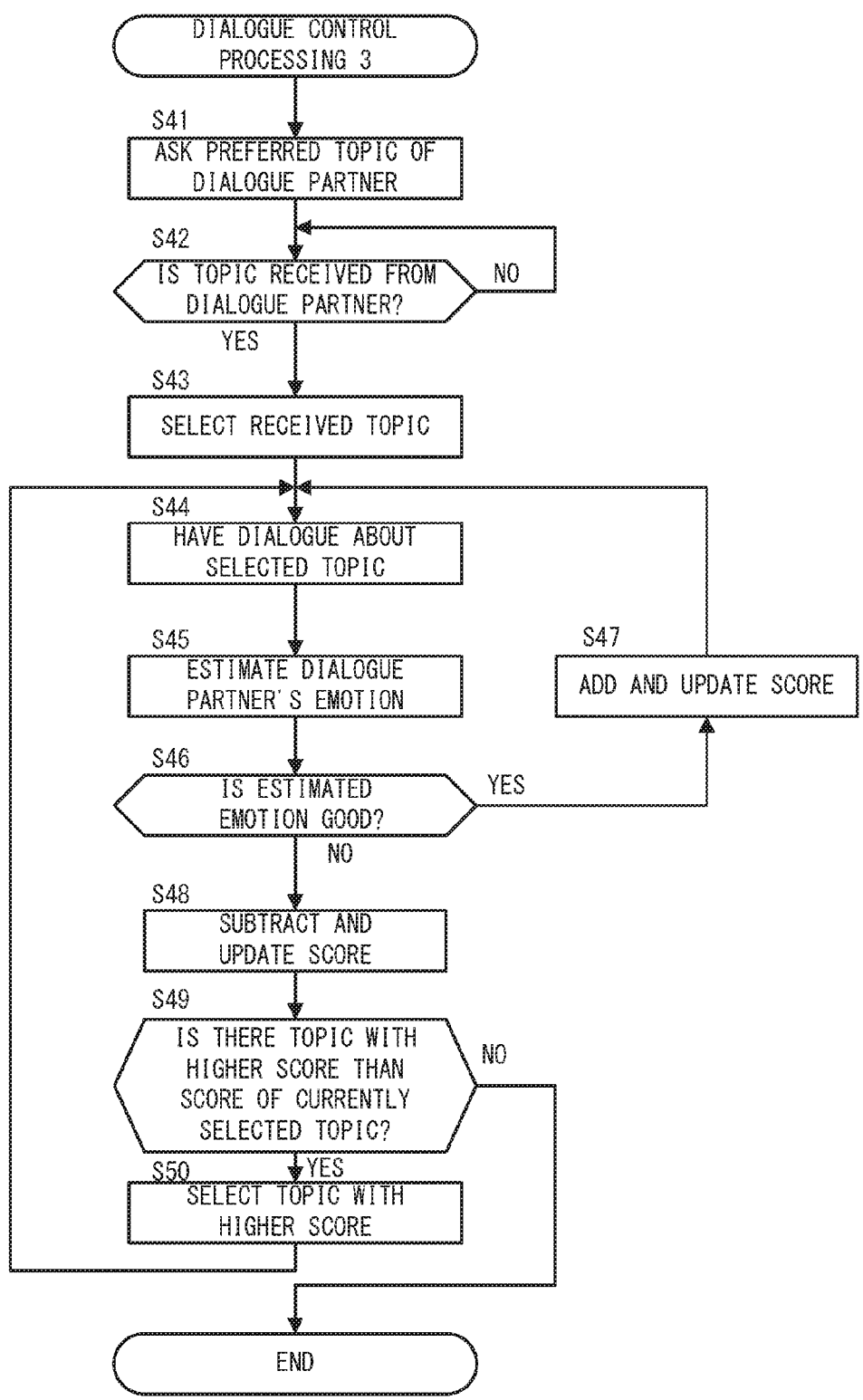
FIG. 10 is a diagram showing an example of a flowchart of the dialogue control processing 3.

Next, the dialogue control processing 3 is explained with reference to FIG. 10. The start timing of this dialogue control processing 3 is the same as the start timing of the dialogue control processing 1.

Firstly, the dialoguer 222 asks what kind of topic the dialogue partner wants to talk about (Step S41). For example, the dialoguer 222 references the question sentence DB 321 and has the speaker 41 utter a question sentence template, "What kind of topics do you want to talk about?"

Next, the dialoguer 222 determines whether a topic is received from the dialogue partner or not (Step S42). The dialoguer 222 determines the above depending on whether or not a topic is included in a plurality of words after converting the dialogue partner's voice picked up by the microphone 40 to text to perform a morphological analysis.

At this point, the dialogue control device 10 waits for receiving a topic from the dialogue partner (No in Step S42) and when the topic is received (Yes in Step S42), the selector 221 selects the received topic (Step S43). The dialoguer 222 has a dialogue on the selected topic (Step S44) and the emotion estimator 21 estimates the dialogue partner's emotion (Step S45). The emotion estimator 21 determines whether the estimated emotion is good or not (Step S46). If the estimated emotion is good (Yes in Step S46), the updater 224 adds to and updates a score of the currently selected topic (Step S47) and then the processing returns to Step S44 to continue the dialogue as long as the estimated emotion does not become bad.

On the other hand, if the estimated emotion is not good (No in Step S46), the selector 221 determines whether there is a higher score than the score of the currently selected topic (Step S49) after the updater 224 subtracts from and updates the score of the currently selected topic (Step S48).

At this point, if there is a higher score than the score of the currently selected topic (Yes in Step S49), the selector 221 selects a topic with a higher score (Step S50) and the processing returns to Step S44. The dialoguer 222 continues the dialogue on the selected topic as long as the dialogue partner's emotion does not become bad (a loop of Steps S44 to S47).

On the other hand, if there is no higher score than the score of the currently selected topic (No in Step S49), the dialogue control processing 3 ends. It is noted that the dialogue control processing 3 may not end and a topic with an unprocessed score may be randomly selected to continue the dialogue even if there is no higher score than the score of the currently selected topic.

As described above, in the dialogue control processing 3, after the dialogue starts with the topic that the dialogue partner prefers, the dialogue is switched to another topic with a higher score than the score of the currently selected topic, to continue the dialogue, every time the dialogue partner shows displeasure. The specific example 4 of the case of having a dialogue with the dialogue partner according to this dialogue control processing 3 is described below.

(1) Dialogue control device 10: "What kind of topics do you want to talk about?"

(2) Dialogue partner: "Well, how about travel?"

(3) Dialogue control device 10: "Shall we talk about travel then?"

(4) Dialogue control device 10: "Have you made a trip recently?"

(5) Dialogue partner: "I have recently been to the sea."

(6) Dialogue control device 10: "What was the sea like?"

(7) Dialogue partner: "It was hot, but the water was emerald green and it was very beautiful."

(8) Dialogue control device 10: "In a hot weather, we would like to go somewhere cool."

(9) Dialogue partner: "It was the sea in the summer, so it was OK with a hot weather."

(10) Dialogue control device 10: "I see. I'm sorry."

(11) Dialogue control device 10: "Shall we talk about shopping then?"

(12) Dialogue partner: "OK. Let's talk about shopping."

After this line (12), the dialogue continues. In this specific example 4, after the dialogue starts with the topic "travel", which the dialogue partner prefers, the dialoguer 222 gives a response inappropriate for the context using the response sentence template with the adjective word "hot" in (8), and as a result, the dialogue partner shows displeasure in (9). Then the dialoguer 222 switches to the topic "shopping", which has a higher score of four than the score of the topic "travel" to continue the dialogue.

According to this dialogue control processing 3, in addition to achieving effects of the above-mentioned dialogue control processing 1 and 2, a conversation most suited to the dialogue partner's feelings can be conducted and the degree of satisfaction of the dialogue partner can be improved because the dialogue can start with the topic that the dialogue partner currently wants to talk about.

(Dialogue Control Processing 4)

Figure 11:
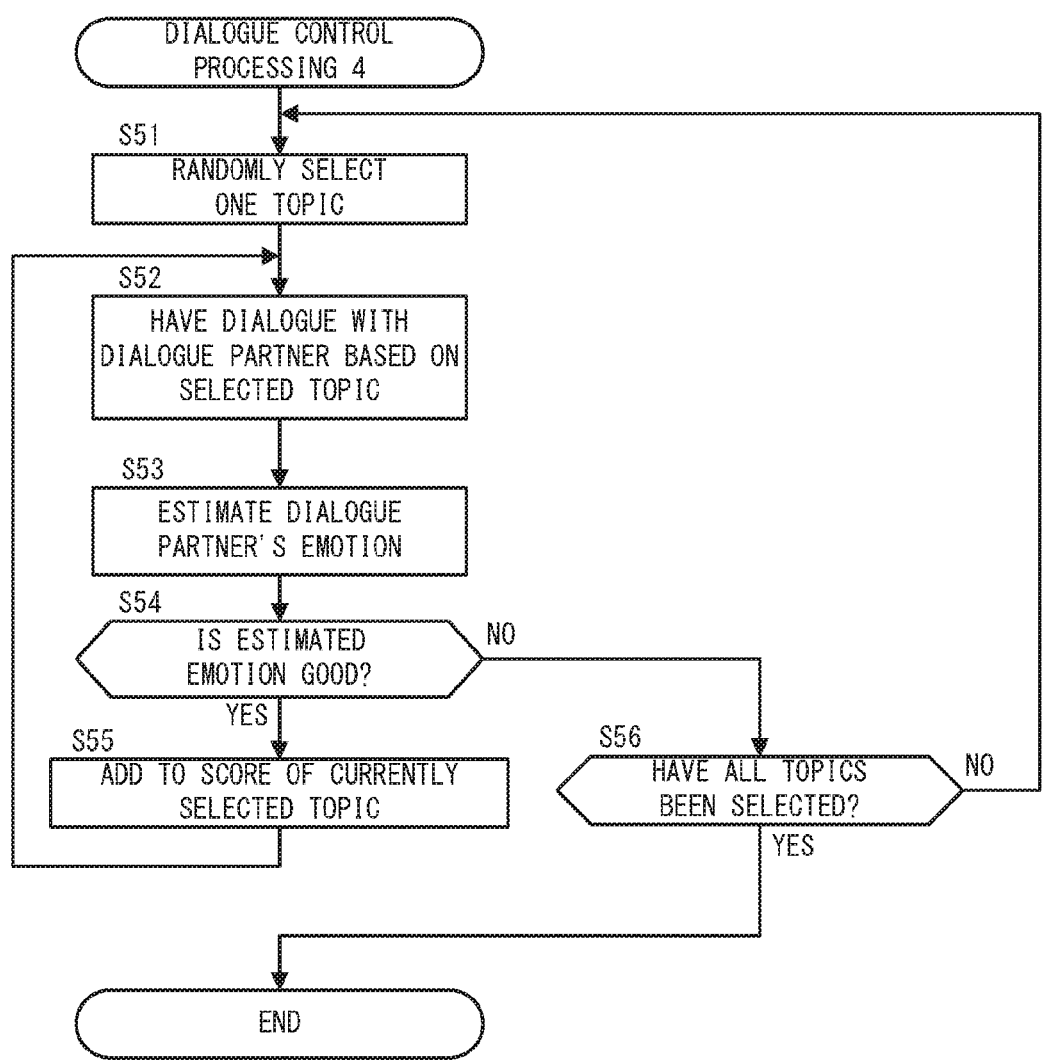
FIG. 11 is a diagram showing an example of a flowchart of the dialogue control processing 4.

For the dialogue control processing 1 to 3, the topic mapping processing and dialogue control processing are separately explained by distinguishing the mapping stage (the machine learning stage) and the utilizing stage of the topic map, but the dialogue control processing is not limited by such distinction. Without distinguishing the mapping and utilizing stages, the dialogue control processing may be immediately performed so as to create a topic map while leading a conversation. The dialogue control processing 4 in this case is explained with reference to FIG. 11. It is noted that Steps S51 to S55 are the same as Steps S11 to S15 of the topic mapping processing. Therefore, the different steps are mainly explained below.

In Steps S51 to S53, each unit of the dialogue controller 22 (the selector 221 and the dialoguer 222) has a dialogue with the dialogue partner based on a randomly selected topic from the default topic map 31 or estimates the dialogue partner's emotion. As long as the estimated emotion is good (while Yes is selected in Step S54), a score of the currently selected topic is added to, and the dialogue is continued (a loop of Steps S52 to S55).

At this point, if the dialogue partner's estimated emotion during the dialogue is not good (No in Step S54), the selector 221 determines whether all topics have been selected (Step S56). If all the topics have not been selected (No in Step S56), the processing returns to Step S51 and the selector 221 randomly selects one topic to repeat the processing of Steps S52 to S55. On the other hand, if all the topics have been selected (Yes in Step S56), the dialogue control processing 4 ends.

In this manner, in this dialogue control processing 4, while the dialogue and the score addition are performed as long as the dialogue partner does not show displeasure with the randomly selected topic, the dialogue is switched to another unselected topic to continue when the dialogue partner shows displeasure. This enables creation of the topic map step by step while the dialogue is continued. Because the dialogue is immediately switched to another topic when the dialogue partner shows displeasure, the dialogue control device 10 searches the dialogue partner's likes and tastes and, at the same time, the dialogue partner can enjoy the conversation for a long time.

It is noted that this processing may be also switched from the dialogue control processing 4 to the dialogue control processing 1 2, or 3 when the score processing of a plurality of topics ends.

Therefore, although individual users generally have different likes and tastes, the communication can continue without making users bored according to the embodiment.

This is the end of the embodiment explanation, but the above embodiments are illustrative and it goes without saying that the configuration of the dialogue control device 10, the contents of the dialogue control processing 1 to 4 and the like are not limited to the description of the above embodiments.

For example, in the embodiments described above, the emotion estimator 21 estimates emotion based on dialogue partner's facial expression, prosody and voice text, but the way how emotions are estimated is not limited thereto. For example, the emotion estimator 21 may estimate emotion from the dialogue partner's non-verbal behavior (gesture). Specifically, the emotion estimator 21 may estimate that the emotion is good if the dialogue partner nods his or her head and that the emotion is not good if the dialogue partner shakes his or her head.

Furthermore, the examples of using voice for responding to each other in a "dialogue" have been explained, but the dialogue may be performed using a keyboard and a display. For example, the dialogue control device 10 may be built into PC or the like for conducting conversations of the specific examples 1 to 4 described above between a user (the dialogue partner) and the PC (the dialogue control device 10) enjoyable as text chatting. In this case, the emotion cannot be estimated with voice prosody, but the emotion can be estimated from the dialogue partner's facial expression using the camera 42, the contents of dialogue sentences (the emotion estimation from words showing whether the emotion is good or bad) or speed or strength of typing on a keyboard.

Furthermore, the embodiments described above are explained on the assumption that the topic map 31 is created by the dialogue control device 10, but the way of topic map creation is not limited thereto. For example, topic maps for each dialogue partner may be previously uploaded to an external server that functions as a knowledge database and the dialogue control device 10 may have a dialogue by accessing the external server every time the dialogue control device 10 references the topic map in the dialogue control processing 1 to 4. This can reduce topic mapping processing loads and save a storage area of the dialogue control device 10.

Figure 12:
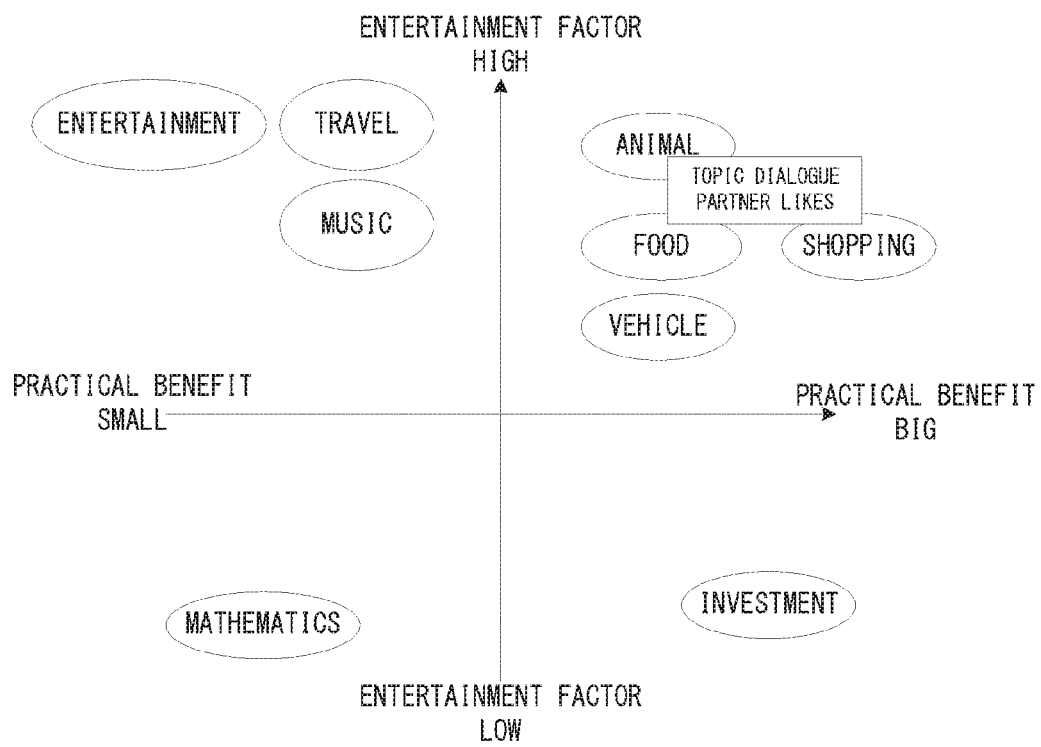
FIG. 12 is a diagram showing an example of a two-dimensional topic map.

In addition, the embodiments described above are explained using an example that the topic map 31 is one-dimensional, but the type of topic map is not limited thereto. For example, an n-dimensional topic map may be created. This dimension number is the feature vector number that exhibits the characteristics of topics. For example, if the topic is "investment", the topic characteristics can be exhibited by a two-dimensional feature vector that has a low entertainment factor with a high practical benefit. FIG. 12 shows an example of the two-dimensional topic map. This topic map is configured with two feature vectors showing topic characteristics (the entertainment and practical benefit factors) and each topic (oval) is mapped according to these characteristics in advance. According to the one-dimensional topic map of FIG. 6, the topic that the dialogue partner likes is located at the position shown by a rectangle in the first quadrant, which has a high practical benefit and high entertainment factors.

This enables the selector 221, when a topic with an unprocessed score is to be selected, to select the topic "vehicle" that is in the same first quadrant that the dialogue partner seems to like to try to have a dialogue. It means that the topic closest to the rectangular position can be selected to try to have a dialogue. In this manner, the two-dimensional topic map allows for estimating the topic that the dialogue partner seems to like and continuing the conversation without hurting the dialogue partner's feeling. A two-dimensional map may be created by positioning favorite topics by calculating a distance based on scores of a plurality of topics scored by the topic mapping processing. For example, if two topics have the same score, a favorite topic may be positioned midway between the two topics and if two topics have different scores, a favorite topic is positioned on a pro-rata basis. It goes without saying that the number of the vectors (dimension number) may be increased to raise the precision of the topics that the dialogue partner likes.

Furthermore, each function of the dialogue control device 10 of the present disclosure can be performed with a computer, such as a regular PC. Specifically, in the above embodiments, it is explained that the programs for the topic mapping and dialogue control processing executed by the dialogue control device 10 are stored in an ROM of the controller 20 in advance. However, the programs may be stored in a non-transitory computer-readable recording medium, such as a flexible disk, a compact disc read only memory (CD-ROM), a digital versatile disc (DVD) and a magneto-optical disc (MO) for distribution, and a computer may be configured to realize each of the aforementioned functions by installing the programs. Further, the dialogue control device 10 of the present disclosure may be installed in a robot to realize a robot with a communication function.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A dialogue control device for undertaking a dialogue with a dialogue partner comprising a controller, an inputter including a microphone and a camera, an outputter, and a storage,
    wherein the storage includes a topic map, the topic map including a plurality of topics each associated with a corresponding score that is kept and updated on a real-time basis during the dialogue with the dialogue partner to provide a numerical measure of a level of interest of a dialogue partner in the topics, the topic map being an n-dimensional topic map with the topics being mapped according to n-dimensional feature vectors that represent multiple characteristics of each of the topics, and the storage further including a text database for storing words associated with emotions, a facial expression database for storing template images of facial expressions associated with emotions, and a prosody database for storing prosodies associated with emotions, and
    wherein the controller
        selects one of the topics from the topic map and causes the outputter to output the selected topic,
        estimates emotion of the dialogue partner based on an utterance of the dialogue partner with respect to the outputted topic picked up by the microphone and converted to text which is referenced to the stored words in the text database, a facial expression of the dialogue partner during the utterance which is determined from a facial image of the dialogue partner taken by the camera and matched to the stored template images in the facial expression database, and the prosody of the utterance referenced to the stored prosodies in the prosody database,
        adds to the score associated with the selected topic if the estimated emotion is good, and
        subtracts from the score associated with the selected topic if the estimated emotion is bad, and switches the selected topic to another topic that is selected based on the feature vector thereof to improve the bad emotion of the dialogue partner.

2. The dialogue control device according to claim 1, wherein the topic map is arranged on an external server, and
    wherein the controller accesses the external server each time the controller references the topic map.

3. The dialogue control device according to claim 1, wherein the controller initially develops the topic map by searching likes and tastes of the dialogue partner.

4. The dialogue control device according to claim 1, wherein the controller predicts a likeable topic for the dialogue partner from the topic map, and causes the outputter to output the predicted topic.

5. A method for controlling a dialogue performed by a dialogue control device including a controller, an inputter including a microphone and a camera, and an outputter, the method comprising:
    creating a topic map including a topic associated with a score that shows a level of interest of a dialogue partner in the topic, the topic map being mapped according to characteristics of the topic;
    storing a text database for storing words associated with emotions, a facial expression database for storing template images of facial expressions associated with emotions, and a prosody database for storing prosodies associated with emotions; and
    using a controller to perform the following steps:
    selecting the topic from the topic map, and causing the outputter to output the selected topic;
    estimating emotion of the dialogue partner based on an utterance of the dialogue partner with respect to the outputted topic picked up by the microphone and converted to text which is referenced to the stored words in the text database, a facial expression of the dialogue partner during the utterance which is determined from a facial image of the dialogue partner taken by the camera and matched to the stored template images in the facial expression database, and the prosody of the utterance referenced to the stored prosodies in the prosody database;

adding to the score associated with the selected topic if the estimated emotion is good; and subtracting from the score associated with the selected topic if the estimated emotion is bad, and switching the selected topic to another topic that is selected based on the score thereof for improving the bad emotion of the dialogue partner.

6. A non-transitory computer-readable information recording medium that records a program for a computer of a dialogue control device that includes a controller, an inputter including a microphone and a camera, and an outputter, and has stored a text database for storing words associated with emotions, a facial expression database for storing template images of facial expressions associated with emotions, and a prosody database for storing prosodies associated with emotions, the program causing the controller to:

create a topic map that includes a topic associated with a score showing a level of interest of a dialogue partner in the topic, the topic map being mapped according to characteristics of the topic;

select the topic from the topic map, and cause the outputter to output the selected topic; estimate emotion of the dialogue partner based on an utterance of the dialogue partner with respect to the outputted topic picked up by the microphone and converted to text which is referenced to the stored words in the text database, a facial expression of the dialogue partner during the utterance which is determined from a facial image of the dialogue partner taken by the camera and matched to the stored template images in the facial expression database, and a prosody of the utterance referenced to the stored prosodies in the prosody database;

add to the score associated with the selected topic if the estimated emotion is good; and subtract from the score associated with the selected topic if the estimated emotion is bad, and switch the selected topic to another topic that is selected based on the score thereof for improving the bad emotion of the dialogue partner.

\* \* \* \* \*

UNITED STATES PATENT AND TRADEMARK OFFICE
CERTIFICATE OF CORRECTION

PATENT NO.         : 9,953,078 B2
APPLICATION NO.    : 15/198904
DATED              : April 24, 2018
INVENTOR(S)        : Yoshihiro Kawamura Page 1 of 1

It is certified that error appears in the above-identified patent and that said Letters Patent is hereby corrected as shown below:

In the Claims

Claim 1, Column 15, Line 64, delete "a the" and insert -- the --, therefor.

Signed and Sealed this
Twenty-sixth Day of June, 2018

Andrei Iancu
*Director of the United States Patent and Trademark Office*